US012491615B2

(12) United States Patent
Yamamoto et al.

(10) Patent No.: US 12,491,615 B2
(45) Date of Patent: Dec. 9, 2025

(54) POWER TOOL AND HAMMER DRILL

(71) Applicant: MAKITA CORPORATION, Anjo (JP)

(72) Inventors: Mizuki Yamamoto, Anjo (JP);
Yoshitaka Machida, Anjo (JP)

(73) Assignee: MAKITA CORPORATION, Anjo (JP)

( * ) Notice: Subject to any disclaimer, the term of this patent is extended or adjusted under 35 U.S.C. 154(b) by 27 days.

(21) Appl. No.: 18/406,941

(22) Filed: Jan. 8, 2024

(65) Prior Publication Data

US 2024/0326214 A1 Oct. 3, 2024

(30) Foreign Application Priority Data

Mar. 27, 2023 (JP) .................................. 2023-049485

(51) Int. Cl.
*B25D 17/04* (2006.01)
*B25D 16/00* (2006.01)

(52) U.S. Cl.
CPC ............. *B25D 17/04* (2013.01); *B25D 16/00* (2013.01)

(58) Field of Classification Search
CPC .... B25D 17/04; B25D 17/043; B25D 17/046; B25D 16/00; B25D 2222/57; B25F 5/00; B25F 5/024; B25F 5/026; B25F 5/02; B24B 23/005
See application file for complete search history.

(56) References Cited

U.S. PATENT DOCUMENTS

| 5,453,577 A * | 9/1995 | Everett .................. B24B 23/005 173/168 |
| 2005/0249564 A1* | 11/2005 | Van Bergen ............ B25F 5/026 408/241 R |
| 2014/0352114 A1 | 12/2014 | Yoshikane et al. |
| 2020/0122280 A1* | 4/2020 | Limberg ................ B23Q 11/00 |
| 2021/0180912 A1* | 6/2021 | Brauer .................... B25F 5/026 |

FOREIGN PATENT DOCUMENTS

| CN | 1751860 | * | 3/2006 | ............. B25F 5/026 |
| DE | 102014400438 | * | 7/2014 | ............. B25F 5/026 |
| EP | 3513914 A1 | * | 7/2019 | ............. B25F 5/024 |
| JP | 5997660 B2 | | 9/2016 | |
| JP | 2020199586 | * | 12/2020 | ............. B25F 5/026 |

* cited by examiner

*Primary Examiner* — Anna K Kinsaul
*Assistant Examiner* — Linda J. Hodge
(74) *Attorney, Agent, or Firm* — Oliff PLC

(57) ABSTRACT

A power tool can receive two different auxiliary handles in a replaceable manner. A power tool includes a tool body, a main handle, a cylindrical handle mount to which a first auxiliary handle or a second auxiliary handle is attachable and having a groove, the first auxiliary handle, and the second auxiliary handle. The first auxiliary handle includes an arc-shaped first band, a band holder that changes the diameter of the first band, and a first protrusion engageable with the groove. The second auxiliary handle includes an arc-shaped second band having a cutout in an axial direction, a fastener that changes the diameter of the second band, and a second protrusion engageable with the groove.

20 Claims, 15 Drawing Sheets

POWER TOOL AND HAMMER DRILL

CROSS-REFERENCE TO RELATED APPLICATIONS

This application claims the benefit of priority to Japanese Patent Application No. 2023-049485, filed on Mar. 27, 2023, the entire contents of which are hereby incorporated by reference.

BACKGROUND

1. Technical Field

The present disclosure relates to a power tool and a hammer drill to which an auxiliary handle is attachable.

2. Description of the Background

A power tool referred to as, for example, a hammer drill includes a tool body including an electric motor as a power source and a main handle integral with the tool body. The tool body has a front end to which a tip tool such as a hammer bit is attachable. The tool body includes a handle mount to which an auxiliary handle is attachable in its front portion near the tip tool mount. A user can hold the power tool in a stable posture by gripping the main handle in a rear portion of the tool body and the auxiliary handle attached to the front portion.

Japanese Patent No. 5997660 (hereafter, Patent Literature 1) describes an auxiliary handle including a resin band. The resin band is substantially C-shaped, with its cylindrical shape partially cut out in the axial direction. The resin band has its two circumferential ends connected with a bolt. The two circumferential ends of the resin band approach each other when the bolt is rotated in the tightening direction. This decreases the diameter of the resin band and attaches the resin band to the handle mount. When the bolt is rotated in the loosening direction, the interval between the two circumferential ends widens. This increases the diameter of the resin band to remove the resin band from the handle mount.

A known power tool, different from the power tool described in Patent Literature 1, can receive an auxiliary handle including an iron band. The iron band has two longitudinal ends held by a band holder. The band holder holds the two ends to allow the iron band to advance or recede by different lengths. When the iron band advances by a smaller length at the two ends, the diameter of the iron band can be elastically decreased to allow attachment of the iron band to the handle mount. When the iron band advances by a larger length at the two ends, the diameter of the iron band can be increased to allow removal of the iron band from the handle mount.

A handle mount to which an iron band is attachable in a known product has a smaller diameter than a front area of the handle mount. The iron band is retained to the handle mount with a step resulting from the difference in the diameters. Resin bands are less elastically deformable than iron bands. Thus, when a resin band is attached to a handle mount to which an iron band is attachable, the less elastically deformable resin band cannot easily move over the step as a retainer at the front end of the handle mount. The resin band is thus not easily removed from the handle mount. When an iron band is attached to the handle mount described in Patent Literature 1, the iron band is retained insufficiently to the handle mount. As described above, no power tool has allowed attachment of both an auxiliary handle with a resin band and an auxiliary handle with an iron band in a replaceable manner.

BRIEF SUMMARY

One or more aspects of the present disclosure are directed to a power tool to which two different auxiliary handles are attachable in a replaceable manner.

A first aspect of the present disclosure provides a power tool, including:
a tool body;
a main handle integral with the tool body;
a handle mount to which a first auxiliary handle or a second auxiliary handle is attachable, the handle mount being cylindrical and located in the tool body, the handle mount having a groove extending in an axial direction on an outer circumferential surface of the handle mount;
the first auxiliary handle including
a first band being arc-shaped,
a band holder holding two ends of the first band to allow the first band to advance or recede to change a diameter of the first band, and
a first protrusion protruding radially inward from an inner circumferential surface of at least one of the first band or the band holder and engageable with the groove; and
the second auxiliary handle including
a second band being arc-shaped, the second band having a cutout in an axial direction,
a fastener configured to adjust a circumferential width of the cutout to change a diameter of the second band, and
a second protrusion protruding radially inward from an inner circumferential surface of the second band and engageable with the groove.

The power tool can thus receive two different auxiliary handles in a replaceable manner.

DETAILED DESCRIPTION

Figure 1:
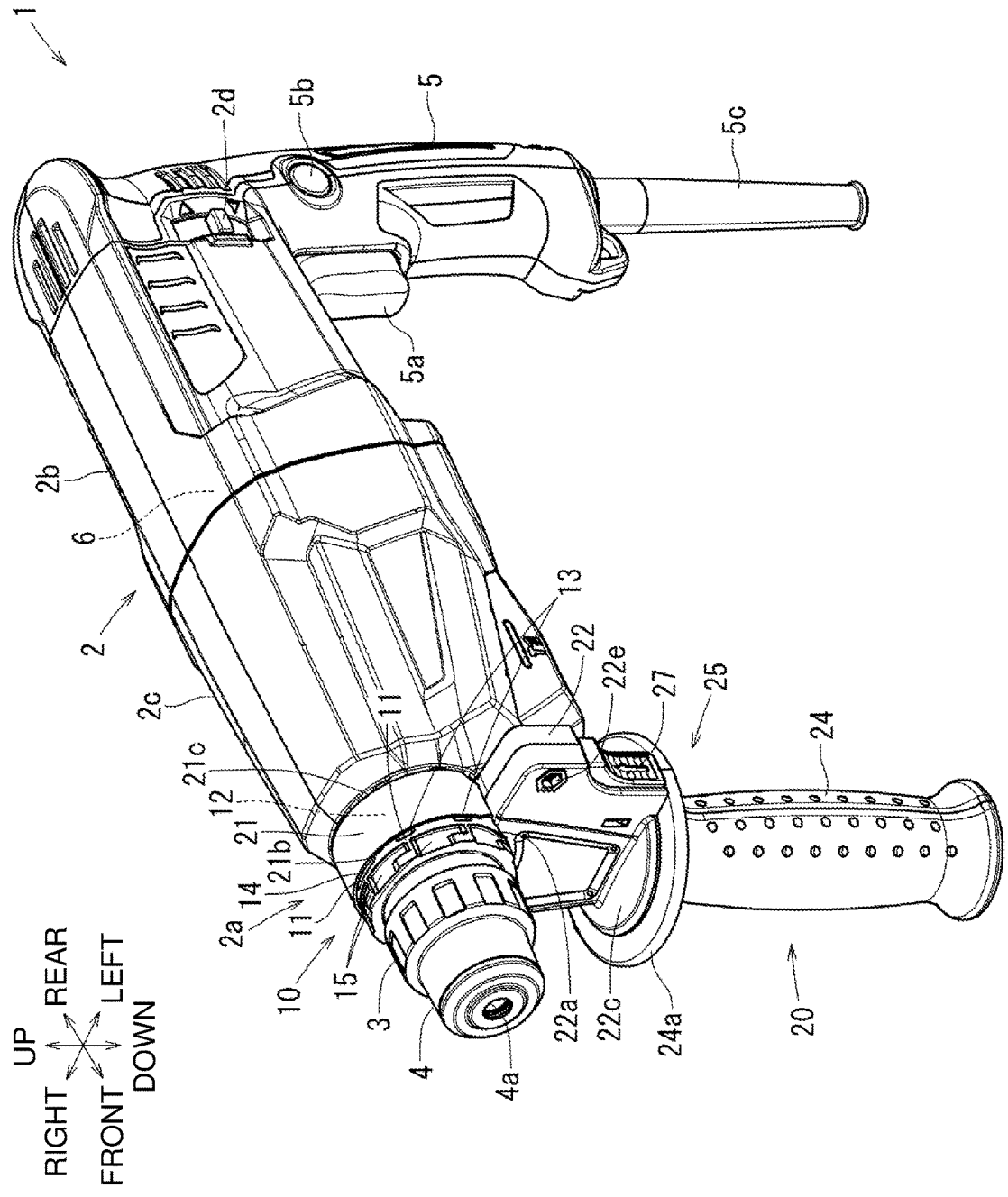
FIG. 1 is a perspective view of a power tool according to an embodiment of the present disclosure with a first auxiliary handle attached.

An embodiment of the present disclosure will be described with reference to FIGS. 1 to 15. In the embodiment, a power tool 1 is a hammer drill. A hammer drill is used to chip or drill a target material, such as concrete, by repeatedly causing a tip tool such as a hammer bit to perform striking movements. As shown in FIG. 1, the power tool 1 includes a tool body 2, a chuck 4, and a main handle 5. The tool body 2 accommodates an electric motor 6. The chuck 4 is located ahead of the tool body 2 to receive a tip tool. The main handle 5 is grippable by a user. The tool body 2 is substantially cylindrical and elongated in the axial direction of the electric motor 6. The main handle 5 is opposite to the chuck 4 and extends in a direction substantially orthogonal to the longitudinal direction of the tool body 2. In the example described below, the chuck 4 is located frontward, and the main handle 5 is located rearward. The main handle 5 extends downward from the tool body 2. The lateral direction is defined with reference to the viewpoint of the user gripping the main handle 5.

As shown in FIG. 1, the tool body 2 includes a motor housing 2b. The motor housing 2b accommodates the electric motor 6. The main handle 5 extends downward from the rear end of the motor housing 2b. The tool body 2 includes a gear housing 2c in front of the motor housing 2b. The gear housing 2c includes a distal end portion 2a in the front. The distal end portion 2a is substantially cylindrical and has the axis extending in the front-rear direction. The chuck 4 is located in front of the distal end portion 2a. The chuck 4 is cylindrical and has the axis extending in the front-rear direction. The chuck 4 has a smaller diameter than the distal end portion 2a. The chuck 4 has a tool insertion hole 4a at its center. The tool insertion hole 4a extends in the front-rear direction. The tool insertion hole 4a receives the base of a tip tool, such as a hammer bit, placed from the front to have the tip tool attached to an output shaft 7 (refer to FIG. 8) inside the gear housing 2c and the distal end portion 2a. The chuck 4 has a substantially cylindrical chuck cover 3 on its rear outer circumference. The chuck cover 3 has a smaller diameter than the distal end portion 2a. When the chuck cover 3 is pulled rearward, the tip tool is removed from the output shaft 7.

As shown in FIG. 1, the gear housing 2c accommodates, for example, a rotation transmission, a motion converter, a striker, and the output shaft 7 (refer to FIG. 8) that start operating when the electric motor 6 is activated. The rotation transmission transmits rotational power of the electric motor 6 to the output shaft 7 while reducing the rotational power. The output shaft 7 thus rotates about its axis extending in the front-rear direction. The motion converter converts the rotational power of the electric motor 6 to a reciprocating linear motion of a piston in the front-rear direction. The striker causes the output shaft 7 to reciprocate in the front-rear direction with power from the piston in the motion converter. The tip tool attached to the output shaft 7 rotates about the axis and reciprocates in the front-rear direction to repeatedly strike a target material in front of the tip tool while rotating.

As shown in FIG. 1, the main handle 5 includes, on its lower end, a power cable 5c extending downward. For example, the power cable 5c is connected to an alternating current (AC) power supply of 100 V to supply power to the electric motor 6. The main handle 5 includes a trigger 5a on its front surface. The user pulls the trigger 5a with one of the fingers holding the main handle 5 to activate the electric motor 6. The main handle 5 includes a lock button 5b on its lateral portion behind the trigger 5a. The lock button 5b can be pressed to switch between an on-state and an off-state. In the off-state of the lock button 5b, releasing the trigger 5a stops the electric motor 6. In the on-state of the lock button 5b, once the trigger 5a is pulled, the electric motor 6 continues operating after the trigger 5a is released. The motor housing 2b includes a forward-reverse switch lever 2d on its lateral portion above the trigger 5a. The forward-reverse switch lever 2d is operable to switch the rotation direction of the electric motor 6.

Figure 2:
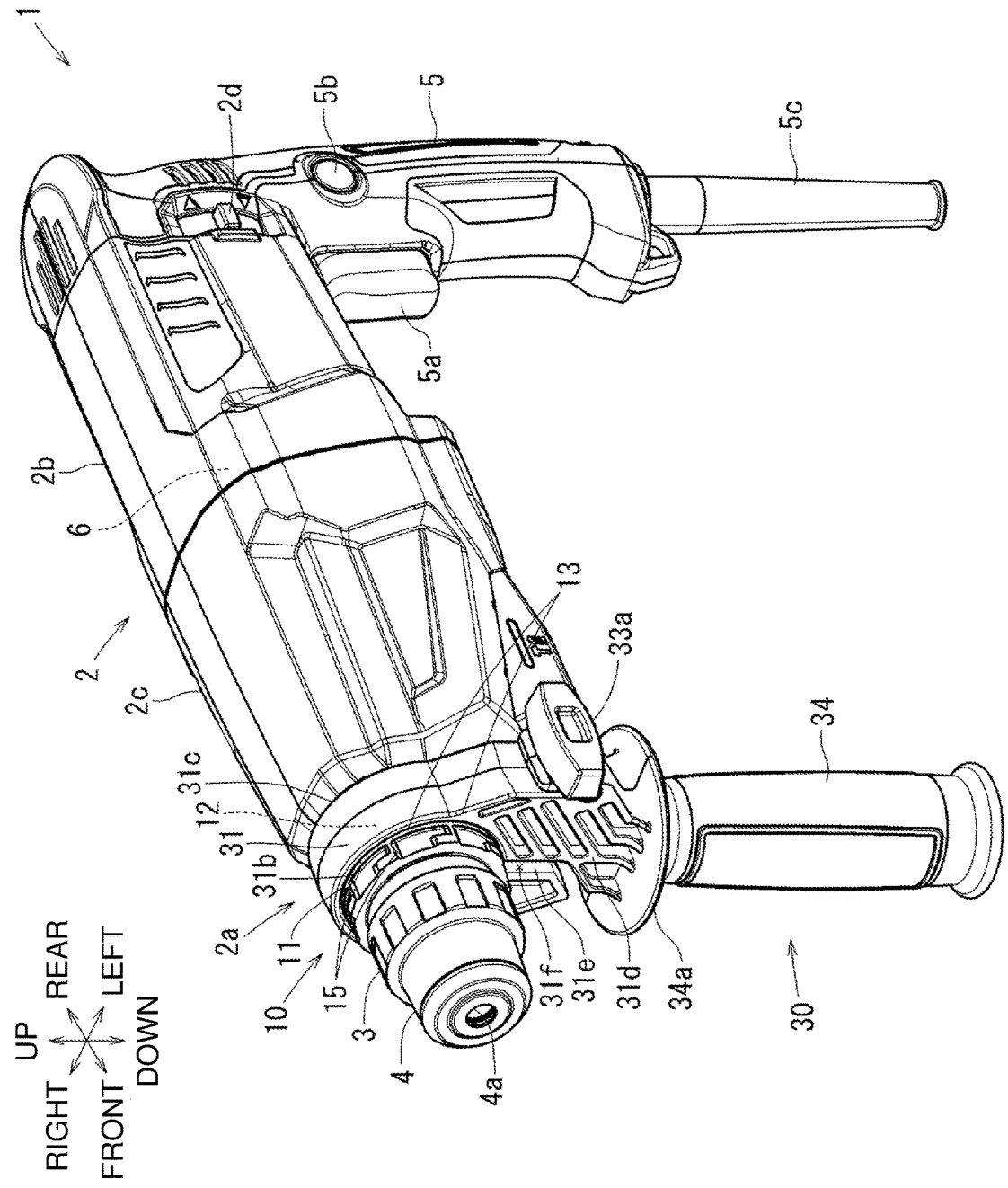
FIG. 2 is a perspective view of the power tool with a second auxiliary handle attached.
Figure 3:
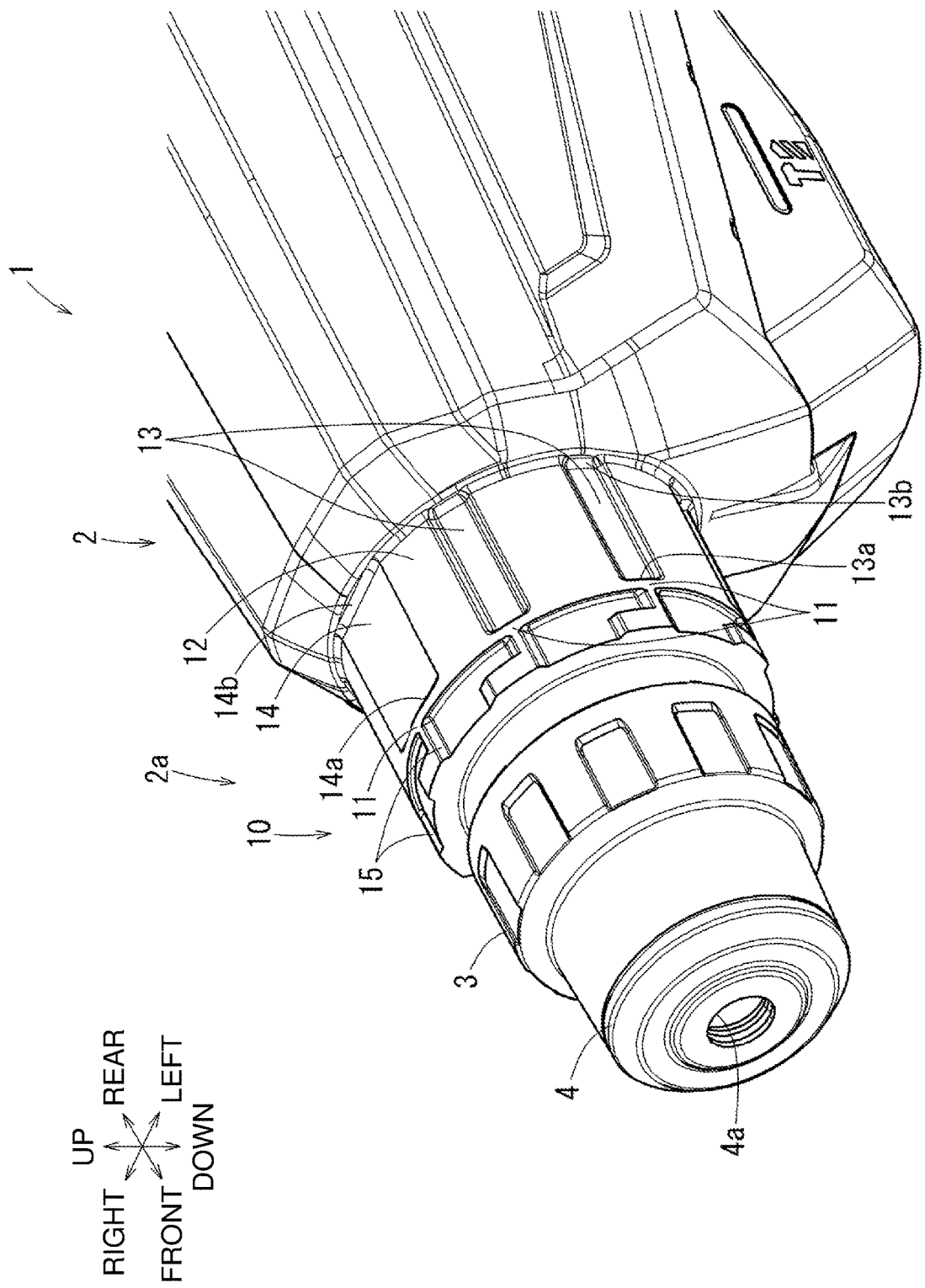
FIG. 3 is an enlarged perspective view of a handle mount.

As shown in FIG. 3, a handle mount 10 is located in the distal end portion 2a of the tool body 2. The handle mount 10 can receive an auxiliary handle in a removable manner. The handle mount 10 can receive a first auxiliary handle 20 (refer to FIG. 1) and a second auxiliary handle 30 (refer to FIG. 2) in a replaceable manner. The first auxiliary handle 20 includes a first band 21. The second auxiliary handle 30 includes a second band 31. The first auxiliary handle 20 and the second auxiliary handle 30 will be described in detail later. The handle mount 10 includes a cylindrical fastening surface 12 and an annular retainer 11. The retainer 11 is located in front of the fastening surface 12. The fastening surface 12 and the retainer 11 have the same radial height from the axial center. The fastening surface 12 has its front end flush with the rear end of the retainer 11.

As shown in FIGS. 3, 4, 7, and 8, the handle mount 10 has, on its outer circumferential surface, grooves 13 and grooves 14 extending in the axial direction (front-rear direction). The grooves 13 are recessed radially inward from the fastening surface 12. Each groove 13 has a trapezoidal cross section as viewed in the front-rear direction. Each groove 14 has a flat surface cut out from the fastening surface 12 in the direction orthogonal to the radial direction. The grooves 13 and 14 are at intervals of 45° in the circumferential direction about an axial center C. More specifically, one groove 14 is located at the upper end (defined as a position at 0°) of the fastening surface 12 and another groove 14 is located at the lower end (defined as a position at 180°) of the fastening surface 12. Six grooves 13 are located at intervals of 45° between the two grooves 14. More specifically, the grooves 13 are at positions of 45°, 90°, 135°, 225°, 270°, and 315°. The grooves 13 and 14 have their front ends 13a and 14a at the same position as the rear end of the retainer 11 in the front-rear direction. Thus, the retainer 11 protrudes radially outward from the front ends 13a and 14a of the grooves 13 and 14. The grooves 13 and 14 have their rear ends 13b and 14b at substantially the same position as the rear end of the fastening surface 12 in the front-rear direction.

Figure 4:
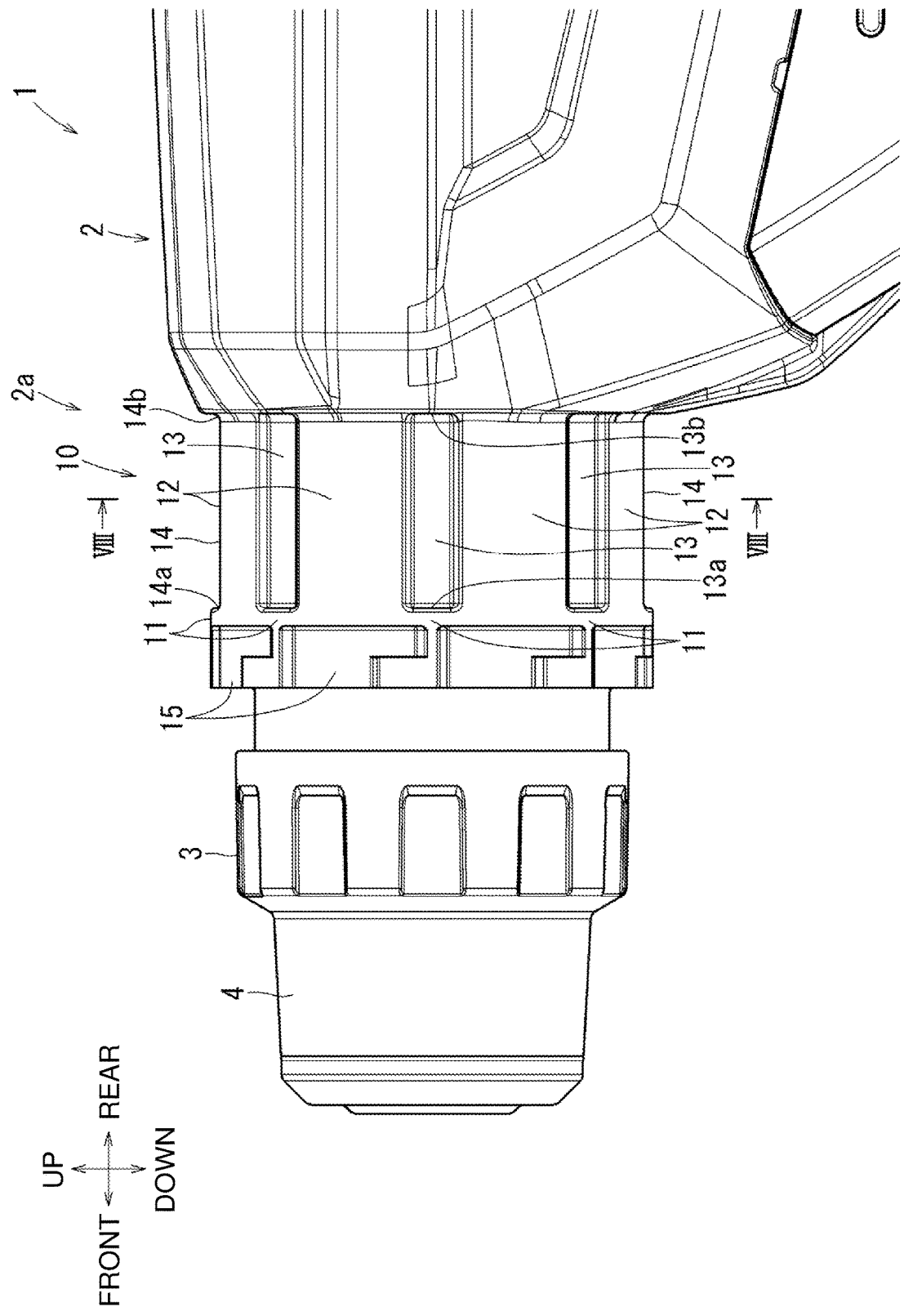
FIG. 4 is a left side view of the handle mount.
Figure 7:
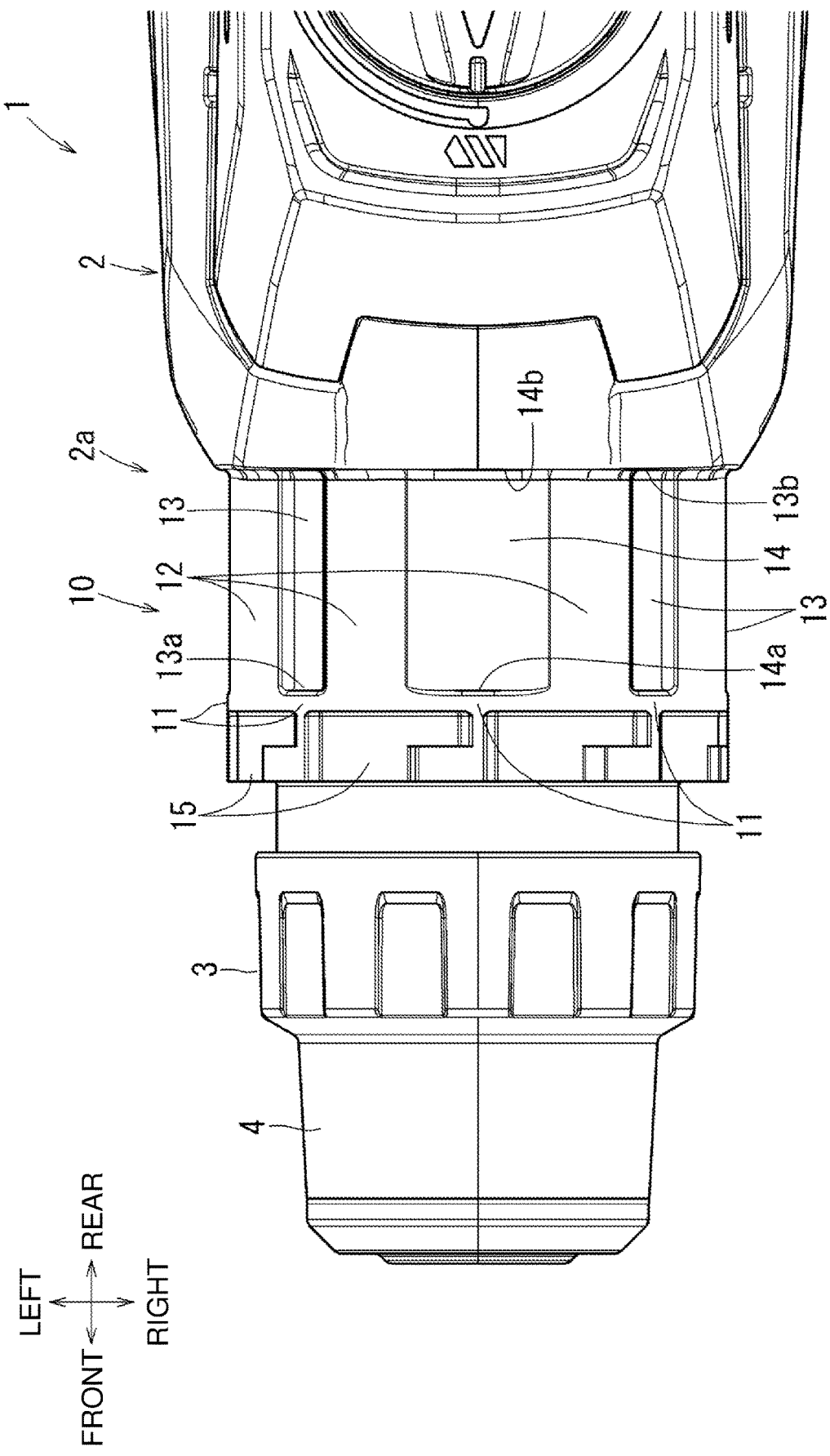
FIG. 7 is a bottom view of the handle mount.

As shown in FIGS. 3, 4, and 7, the tool body 2 includes a cup mount 15 in the distal end portion 2a. The cup mount 15 can receive a substantially cylindrical dust collection cup prepared separately. The cup mount 15 is located in front of the retainer 11. The cup mount 15 is substantially cylindrical and has the same diameter as or a smaller diameter than the retainer 11. The cup mount 15 has multiple L-shaped grooves each including an axial groove and a circumferential groove. The dust collection cup is placed from the front to the rear of the cup mount 15, and is rotated circumferentially relative to the cup mount 15. The dust collection cup can thus be attached to cover the chuck 4 and the tip tool from outside in the radial direction.

As shown in FIGS. 1 and 9 to 11, the first auxiliary handle 20 includes the first band 21, a band holder 22, and a grip 24. The first band 21 is curved in an arc. The band holder 22 holds two ends of the first band 21. The grip 24 is connected to the band holder 22. The first band 21 is formed from elastic and rigid iron. The first band 21 has a substantially uniform thickness. The first band 21 is located above the band holder 22. The grip 24 is cylindrical and extends vertically below the band holder 22. The grip 24 has its surface covered with an elastomer resin layer to increase the slip resistance for the user gripping the grip. Although the vertical and lateral directions of the first auxiliary handle 20 are herein defined for ease of explanation, the first auxiliary handle 20 may be in different orientations relative to the power tool 1. For example, the grip 24 may extend, for example, leftward, rightward, upward, diagonally downward to the left, diagonally upward to the left, diagonally downward to the right, or diagonally upward to the right relative to the handle mount 10.

Figure 9:
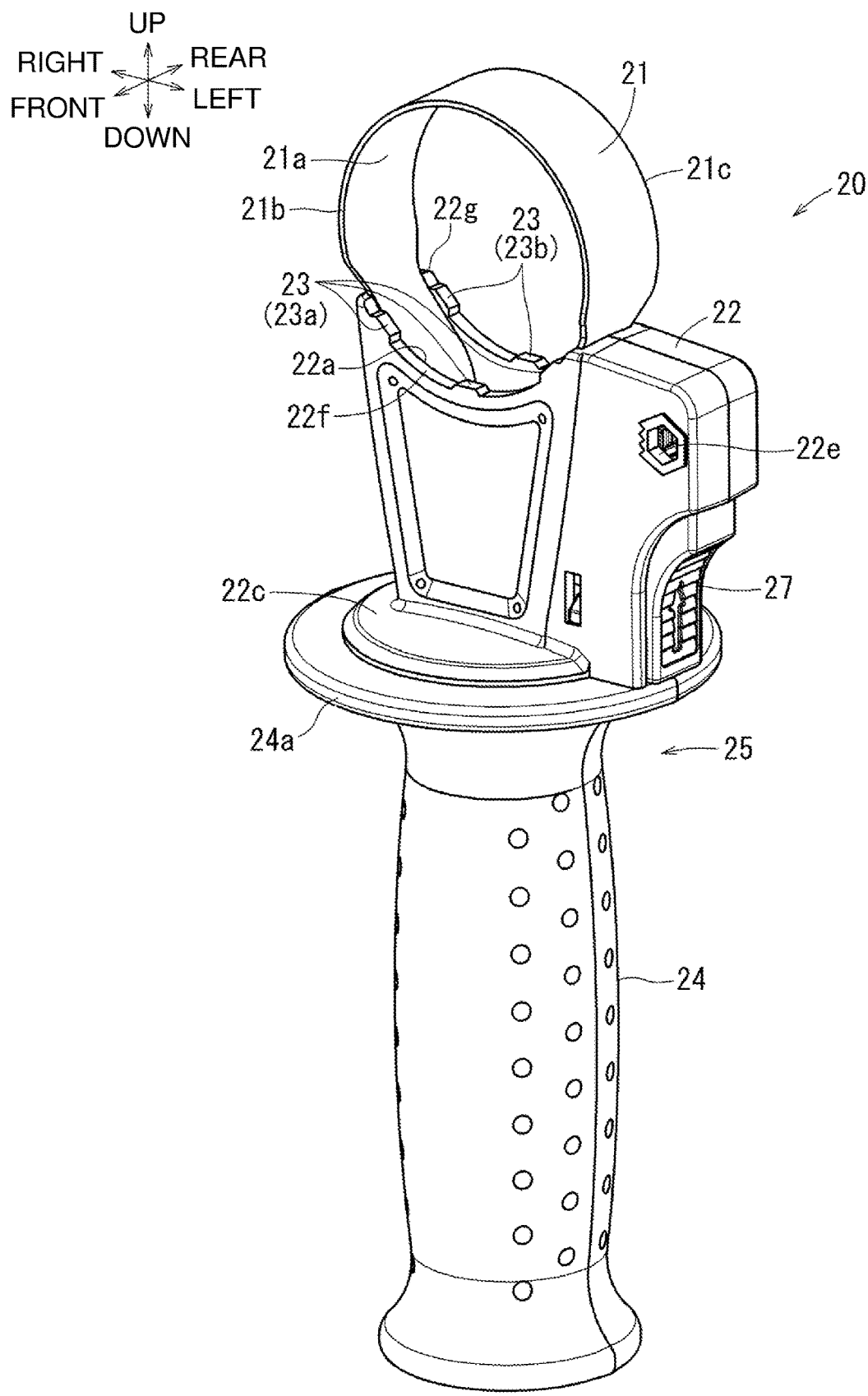
FIG. 9 is a perspective view of the first auxiliary handle.
Figure 10:
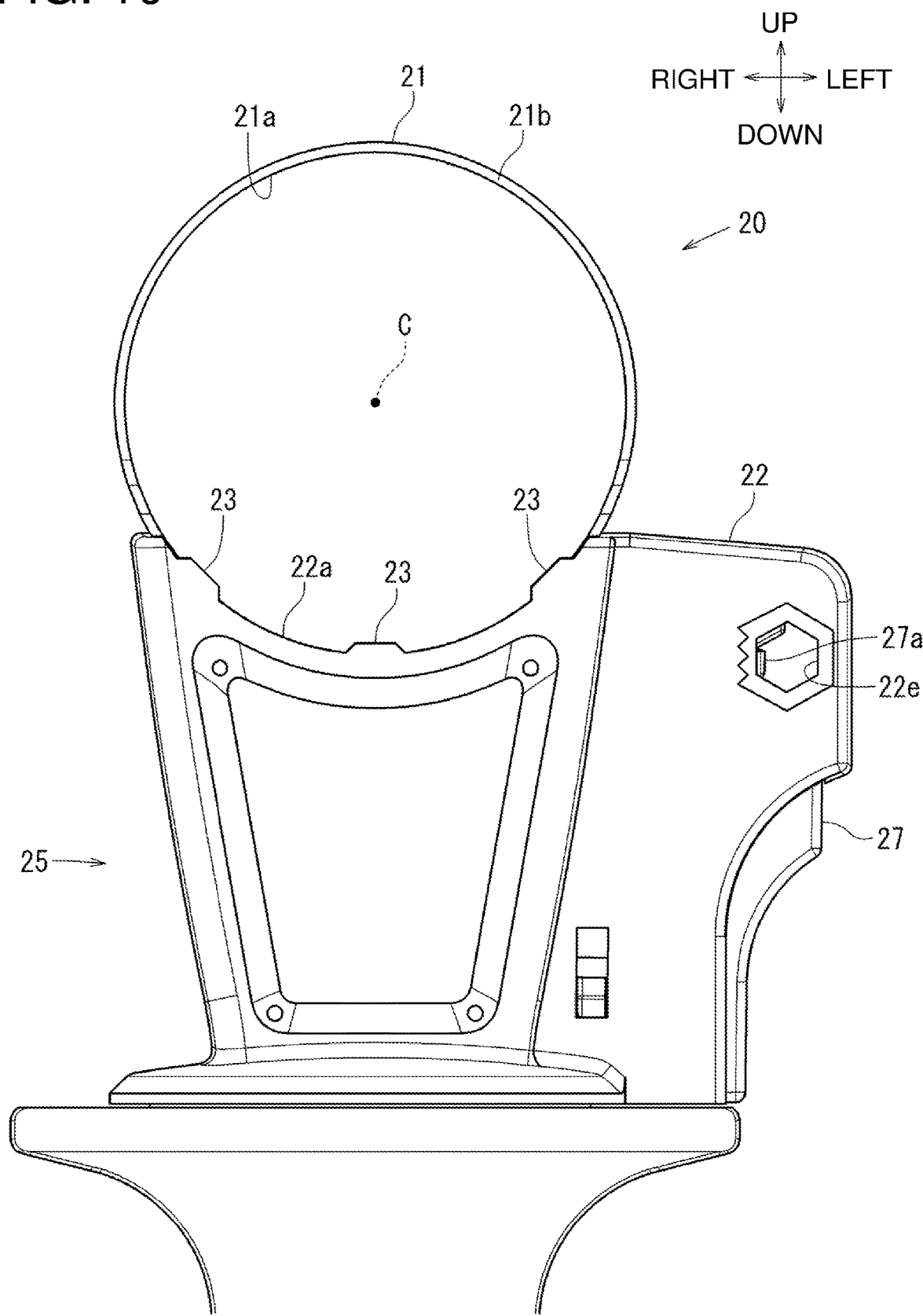
FIG. 10 is a front view of the first auxiliary handle.

As shown in FIG. 9, the grip 24 includes a disk-shaped flange 24a on its upper end. The flange 24a extends in a direction orthogonal to the vertical direction. The band holder 22 includes a disk-shaped flange 22c on its lower end. The flange 22c extends in a direction orthogonal to the vertical direction, and is slidable on the upper surface of the flange 24a. The grip 24 is rotatable relative to the band holder 22 about a threaded shaft part 26b of a band connector 26 (described later).

As shown in FIGS. 9 to 12, the band holder 22 has an opening 22a in its upper portion. The opening 22a is open upward. The opening 22a is arc-shaped as viewed in the front-rear direction and is rectangular as viewed from above. The opening 22a is defined by the inner circumferential surface of a front wall 22f and the inner circumferential surface of a rear wall 22g. The front wall 22f and the rear wall 22g include first protrusions 23 on their inner circumferential surfaces. The first protrusions 23 protrude radially inward. The front wall 22f and the rear wall 22g correspond to axial edges of the band holder 22. The first protrusions 23, to be fitted into the grooves 13 (refer to FIG. 8), are trapezoidal as viewed in the front-rear direction and have substantially the same shapes as the cross sections of the grooves 13. The front wall 22f and the rear wall 22g each include three first protrusions 23. The three first protrusions 23 are located at intervals of 45° in the circumferential direction about the axial center C of the handle mount 10 (refer to FIG. 8). The first protrusions 23a on the front wall 22f and the first protrusions 23b on the rear wall 22g overlap each other as viewed in the front-rear direction.

Figure 11:
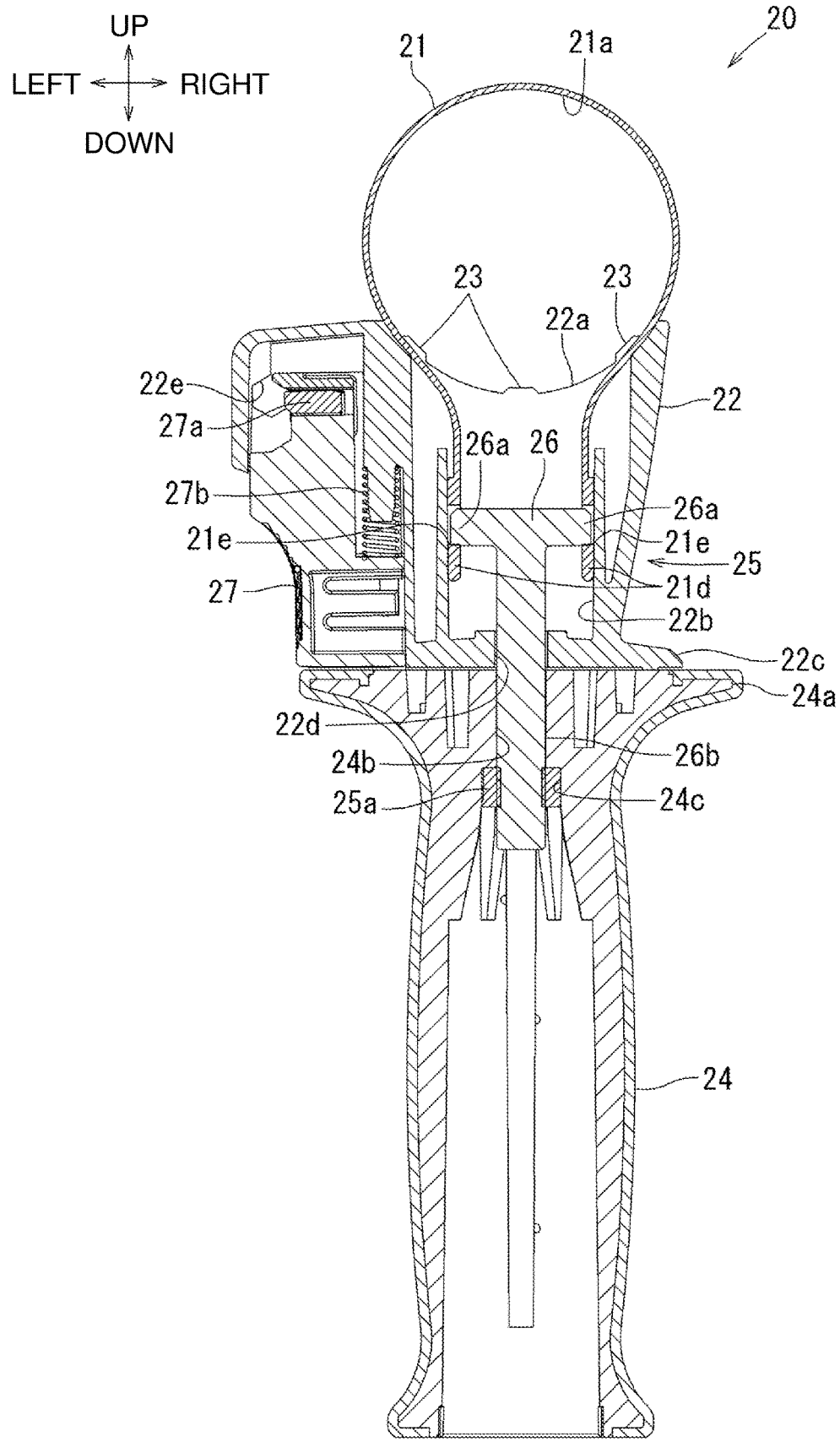
FIG. 11 is a longitudinal sectional view of the first auxiliary handle.
Figure 12:
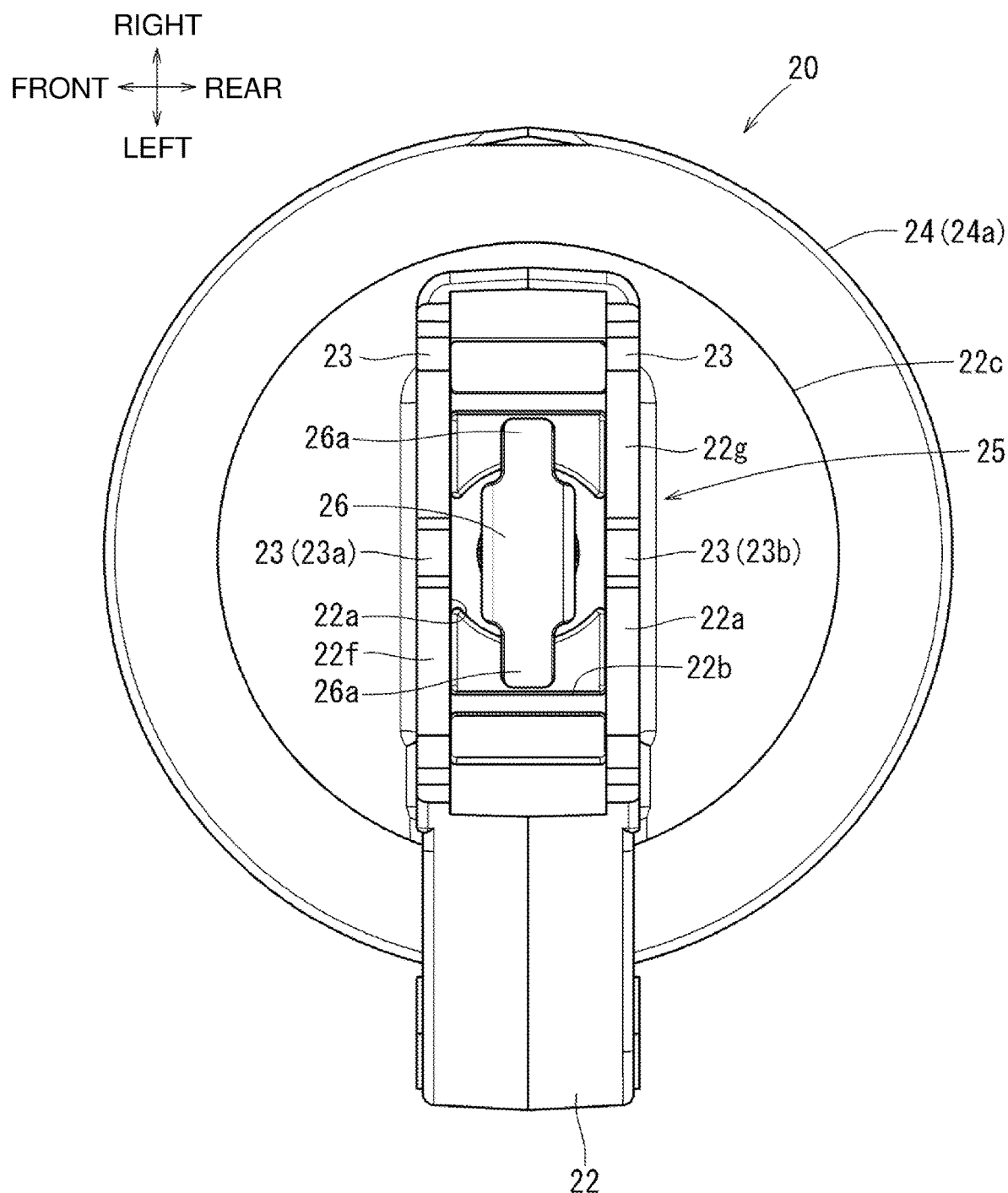
FIG. 12 is a top view of the first auxiliary handle with a first band removed.

As shown in FIGS. 11 and 12, the first auxiliary handle 20 includes a fastening unit 25. The fastening unit 25 fastens the first band 21 to the fastening surface 12 (refer to FIG. 1) by changing the length by which the first band 21 advances or recedes relative to the opening 22a. A box-shaped recess 22b is located inward from and below the opening 22a. The box-shaped recess 22b is rectangular and is open upward. The box-shaped recess 22b receives a band connector 26 included in the fastening unit 25. The band connector 26 is vertically movable along the wall surface of the box-shaped recess 22b. The band connector 26 includes a pair of insertion portions 26a in its upper portion. The pair of insertion portions 26a is in the shape of a rectangular prism extending laterally. The first band 21 has insertion holes 21e at the two longitudinal ends 21d. The insertion holes 21e are rectangular and extend through the first band 21 in the thickness direction. The insertion holes 21e receive the insertion portions 26a. This allows the first band 21 to advance or recede vertically relative to the opening 22a in response to vertical movement of the band connector 26. The first band 21 has a diameter that is increased or decreased in response to a change in the length by which the first band 21 advances or recedes. With a smaller diameter, the first band 21 has an inner circumferential surface 21a in the shape of an arc along the arc-shaped opening 22a.

As shown in FIG. 11, the box-shaped recess 22b has a through-hole 22d in its lower end. The through-hole 22d is circular and extends vertically through the band holder 22. The band connector 26 extending vertically is placed through the through-hole 22d and protrudes toward the grip 24. The band connector 26 includes, in its lower portion, a threaded shaft part 26b with an external thread.

As shown in FIG. 11, the grip 24 has a through-hole 24b at the center. The through-hole 24b is circular and extends vertically through the grip 24. The grip 24 has a hexagonal nut engagement recess 24c at the lower end of the through-hole 24b. The nut engagement recess 24c receives a hexagonal nut 25a screwed onto the threaded shaft part 26b. The hexagonal nut 25a is locked by the nut engagement recess 24c in a nonrotatable manner relative to the grip 24. When the grip 24 is rotated about the axis of the threaded shaft part 26b, the hexagonal nut 25a also rotates about the axis of the threaded shaft part 26b. The threaded shaft part 26b screwed into the hexagonal nut 25a thus moves vertically relative to the hexagonal nut 25a. As the threaded shaft part 26b moves upward, the first band 21 advances by a larger length and thus has a larger diameter. As the threaded shaft part 26b moves downward, the first band 21 advances by a smaller length and thus has a smaller diameter.

Figure 5:
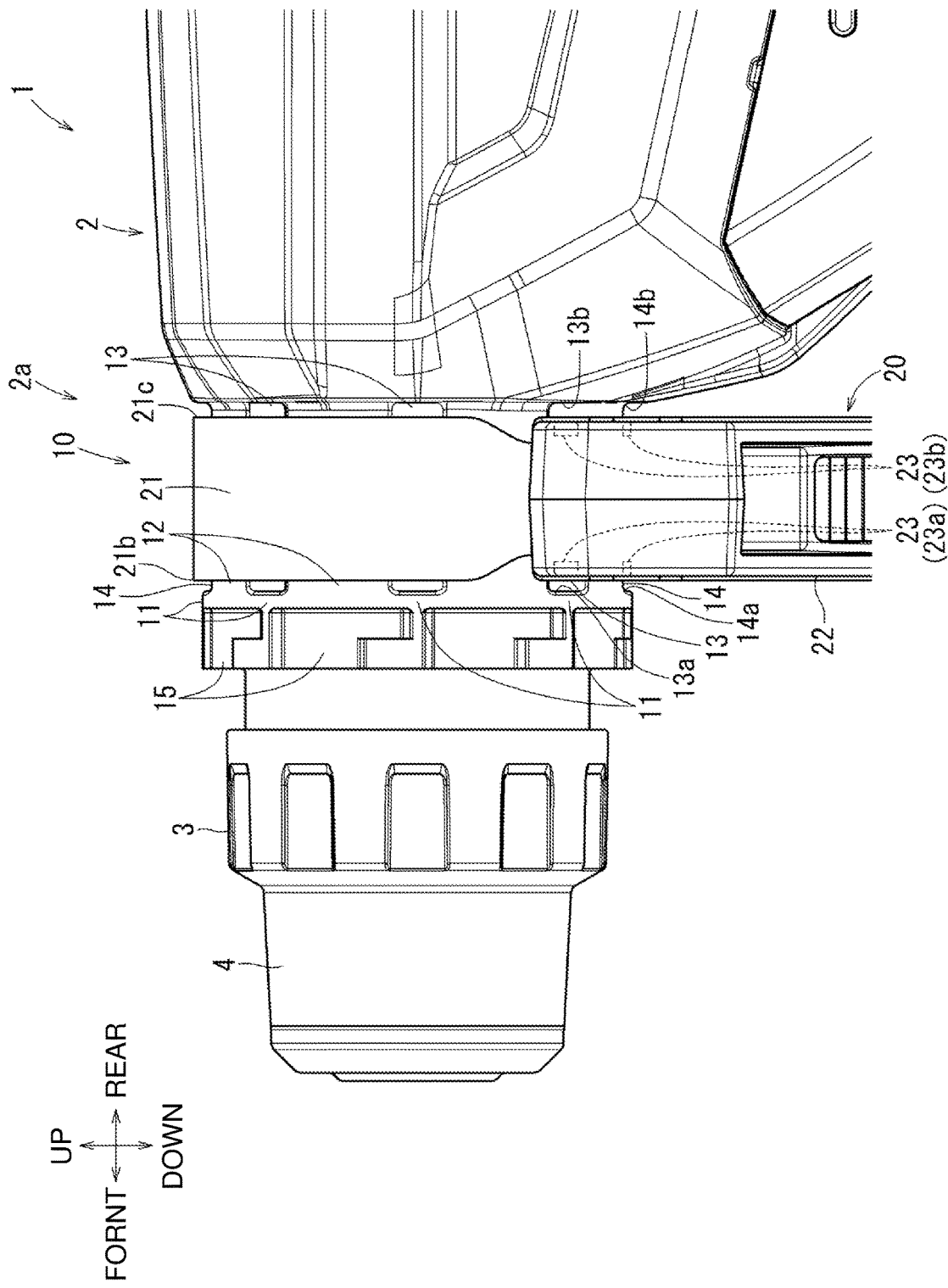
FIG. 5 is a left side view of the handle mount with the first auxiliary handle attached.

As shown in FIG. 5, the first band 21 has a front end 21b substantially at the same position as the front ends of the front first protrusions 23a in the front-rear direction. The first band 21 has a rear end 21c substantially at the same position as the rear ends of the rear first protrusions 23b in the front-rear direction. The grooves 13 and 14 are longer in the axial direction (front-rear direction) than the width between the front ends of the front first protrusions 23a and the rear ends of the rear first protrusions 23b.

As shown in FIG. 5, the first band 21 with an increased diameter is moved from the front to the rear of the tool body 2, or more specifically, to a radially outward position of the fastening surface 12. The diameter of the first band 21 is then decreased. The inner circumferential surface 21a (refer to FIG. 10) of the first band 21 is thus fastened along the fastening surface 12. In this state, the front end 21b of the first band 21 and the front first protrusions 23a are located rearward from the front ends 13a and 14a of the grooves 13 and 14. The rear end 21c of the first band 21 and the rear first protrusions 23b are located frontward from the rear ends 13b and 14b of the grooves 13 and 14. The first protrusions 23a are thus received and fitted into the grooves 13. The first protrusions 23b are received in and engaged with the grooves 14.

As shown in FIGS. 1 and 11, the band holder 22 has a hexagonal pole insertion hole 22e. A hammer pole prepared separately is placeable through the pole insertion hole 22e in the front-rear direction. The hammer pole is used to form holes with a predetermined depth repeatedly into a target material. The band holder 22 includes, below the pole insertion hole 22e, a lock release button 27 that is operable by pressing. The lock release button 27 is urged downward by a compression spring 27b. The lock release button 27 includes a pole engagement portion 27a in its upper portion. The pole engagement portion 27a includes rack teeth aligned in the front-rear direction. Without the lock release button 27 being pressed, the rack teeth on the pole engagement portion 27a move to a right portion of the pole insertion hole 22e. The rack teeth on the pole engagement portion 27a thus engage with rack teeth on the hammer pole placed through the pole insertion hole 22e. The hammer pole is locked at a position at which the hammer pole protrudes frontward by a predetermined length in the front-rear direction. When the lock release button 27 is pressed upward against the urging force, the rack teeth on the pole engagement portion 27a retract from the pole insertion hole 22e. The rack teeth on the pole engagement portions 27a are thus disengaged from the rack teeth on the hammer pole, allowing the hammer pole to be movable in the front-rear direction.

As shown in FIGS. 2 and 13 to 15, the second auxiliary handle 30 includes a second band 31 and a grip 34. The second band 31 is substantially C-shaped, with its cylindrical shape partially cut out in the axial direction. The grip 34 is connected to the second band 31. The second band 31 is formed from a resin that is relatively elastic and relatively rigid. The second band 31 has an inner circumferential surface 31a that is arc-shaped as viewed in the front-rear direction. The grip 34 is cylindrical and extends vertically below the second band 31. The grip 34 has its surface covered with an elastomer resin layer to increase the slip resistance for the user gripping the grip. The grip 34 includes a flange 34a on its upper end. The flange 34a is disk-shaped and extends in a direction orthogonal to the vertical direction. Although the vertical and lateral directions of the second auxiliary handle 30 are herein defined for ease of explanation, the second auxiliary handle 30 may be in different orientations relative to the power tool 1. For example, the grip 34 may extend, for example, leftward, rightward, upward, diagonally downward to the left, diagonally upward to the left, diagonally downward to the right, or diagonally upward to the right, relative to the handle mount 10.

Figure 13:
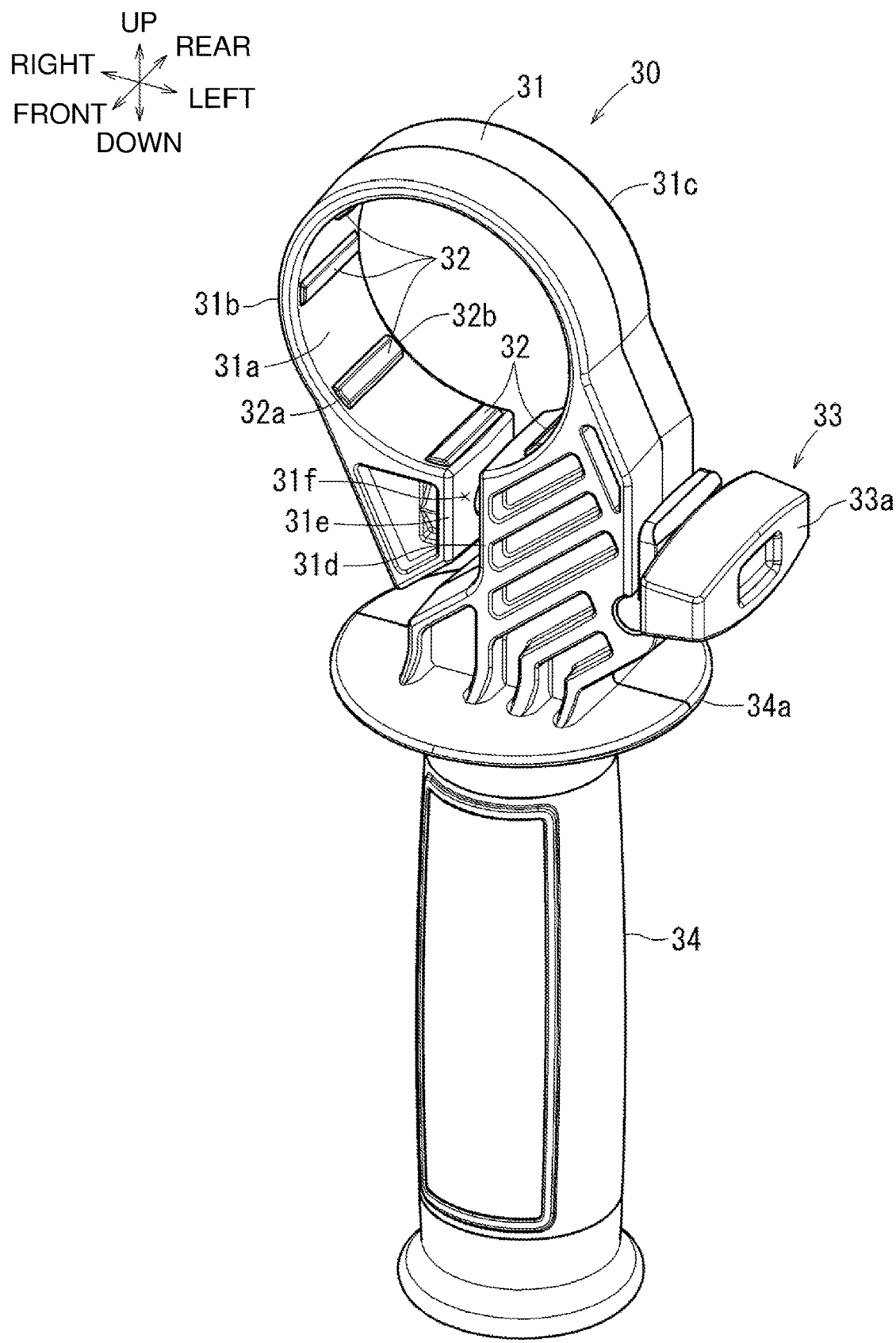
FIG. 13 is a perspective view of the second auxiliary handle.
Figure 14:
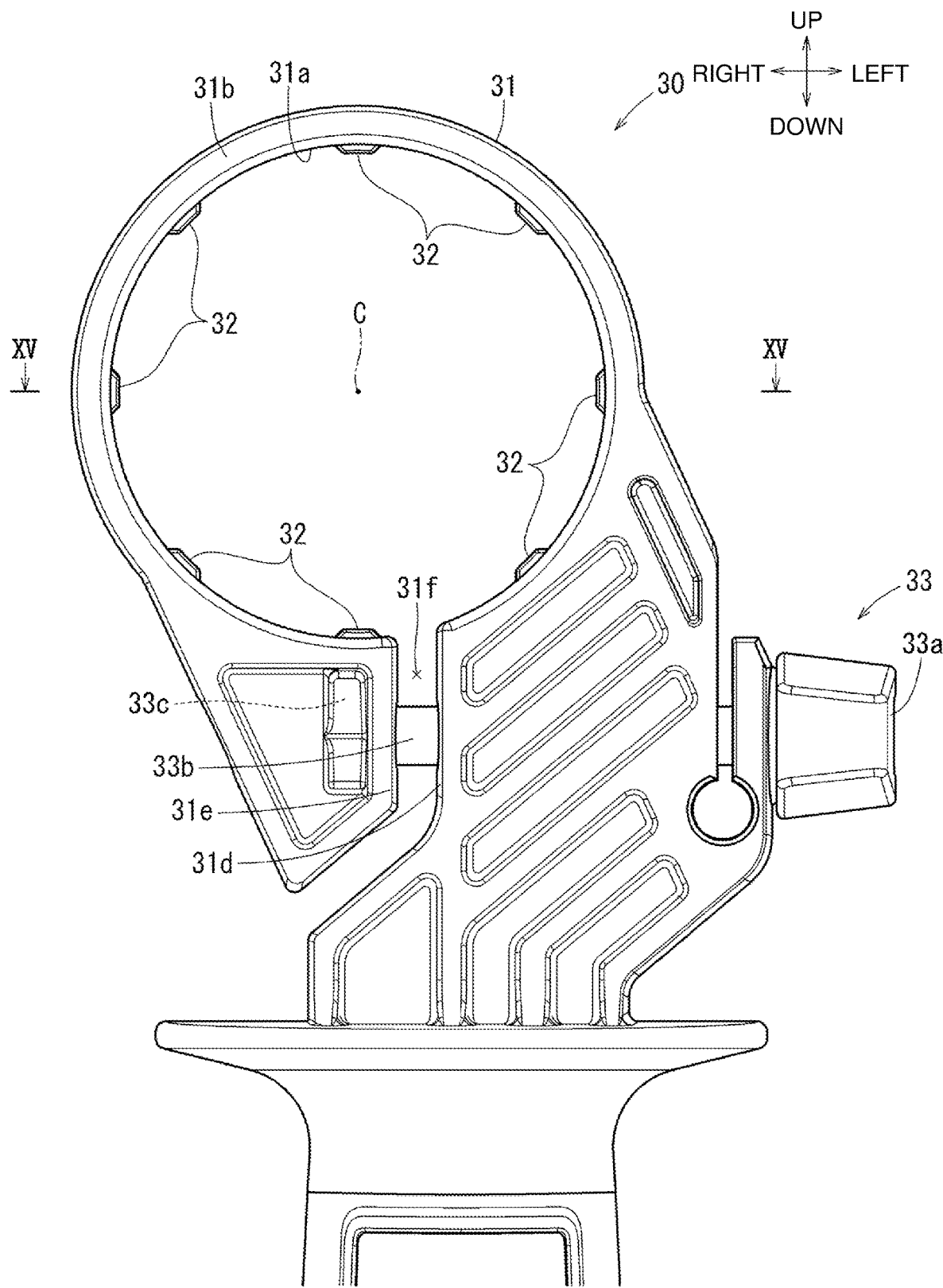
FIG. 14 is a front view of the second auxiliary handle.
Figure 15:
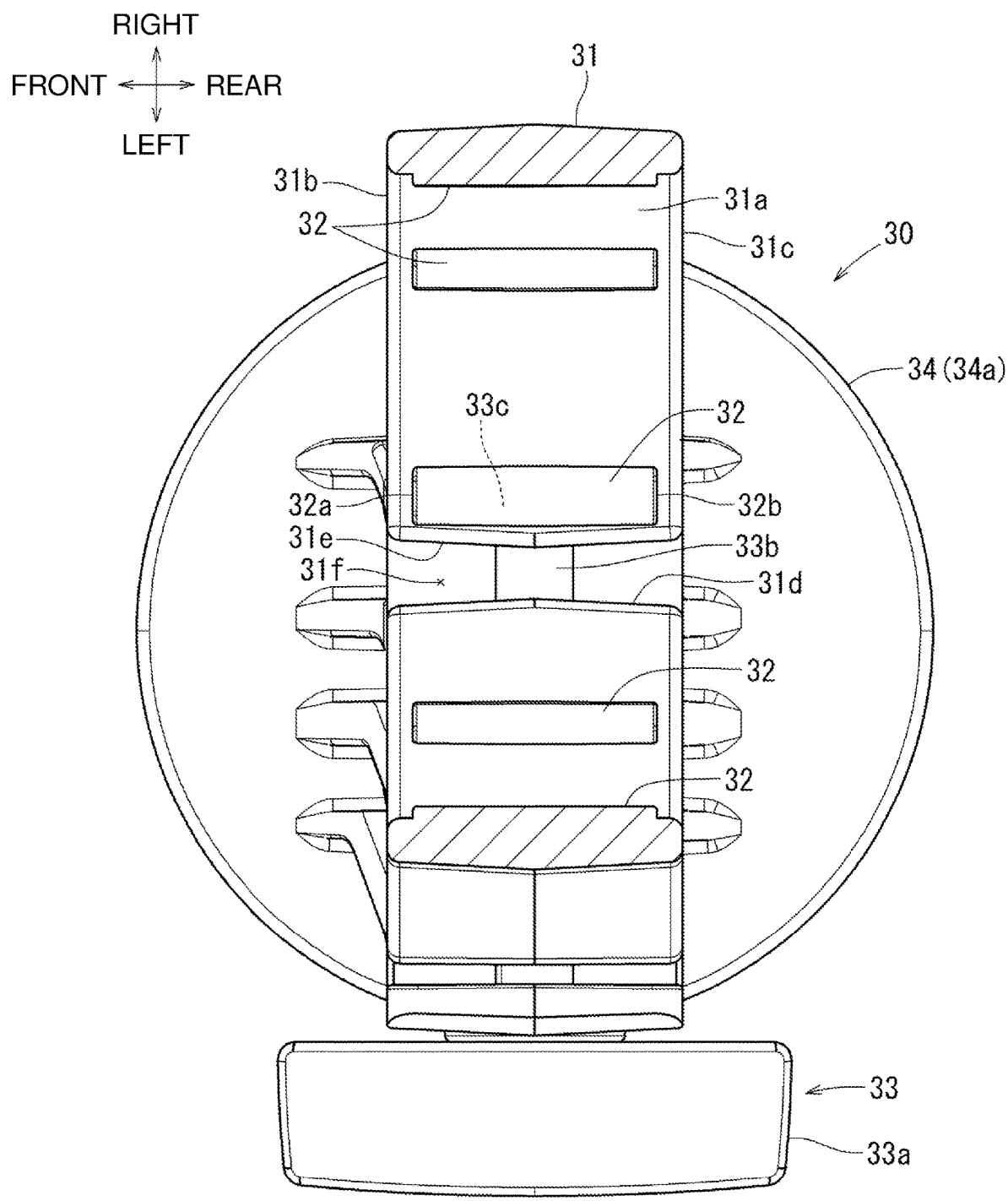
FIG. 15 is a cross-sectional view taken along line XV-XV in FIG. 14 as viewed in the direction indicated by the arrows.

As shown in FIGS. 13 to 15, the second band 31 includes second protrusions 32 on the inner circumferential surface 31a. The second protrusions 32 protrude radially inward. The second protrusions 32, to be fitted into the grooves 13 (refer to FIG. 8), have substantially the same shapes as the cross sections of the grooves 13. The second protrusions 32 are trapezoidal as viewed in the front-rear direction. Eight second protrusions 32 are located at intervals of 45° in the circumferential direction about the axial center C of the handle mount 10 (refer to FIG. 8). The second protrusions 32 have front ends 32a located near a front end (edge) 31b of the second band 31 and slightly rearward from the front end 31b. The second protrusions 32 have rear ends 32b located near a rear end (edge) 31c of the second band 31 and slightly frontward from the rear end 31c.

As shown in FIGS. 13 and 14, the second auxiliary handle 30 includes a fastener 33. The fastener 33 increases or decreases the diameter of the second band 31. The fastener 33 includes a bolt 33b, an operation portion 33a, and a hexagonal nut 33c. The operation portion 33a is operable to rotate the bolt 33b about the axis. The hexagonal nut 33c is screwed onto the bolt 33b. The second band 31 has a circumferential end 31d in its basal portion and a cantilevered circumferential end 31e in its distal portion. The circumferential ends 31d and 31e face each other circumferentially. The circumferential ends 31d and 31e are connected circumferentially with the bolt 33b screwed into the circumferential ends 31d and 31e. The operation portion 33a is located, in a rotatable manner, adjacent to the basal portion (left portion) of the second band 31 having the circumferential end 31d. The hexagonal nut 33c is screwed onto the bolt 33b while being locked in a nonrotatable manner at the right circumferential end 31e.

As shown in FIGS. 13 and 14, the arc-shaped second band 31 has a cutout 31f in the axial direction between the circumferential ends 31d and 31e in the circumferential direction. As the operation portion 33a is rotated in the tightening direction, the hexagonal nut 33c at the circumferential end 31e moves leftward relative to the bolt 33b. The circumferential ends 31d and 31e thus move closer to each other, narrowing the circumferential width of the cutout 31f. In other words, the circumferential ends 31d and 31e have a shorter circumferential distance in between. This decreases the diameter of the second band 31. As the operation portion 33a is rotated in the loosening direction, the hexagonal nut 33c at the circumferential end 31e moves rightward relative to the bolt 33b. The circumferential ends 31d and 31e thus move away from each other, widening the circumferential width of the cutout 31f. This increases the diameter of the second band 31.

Figure 6:
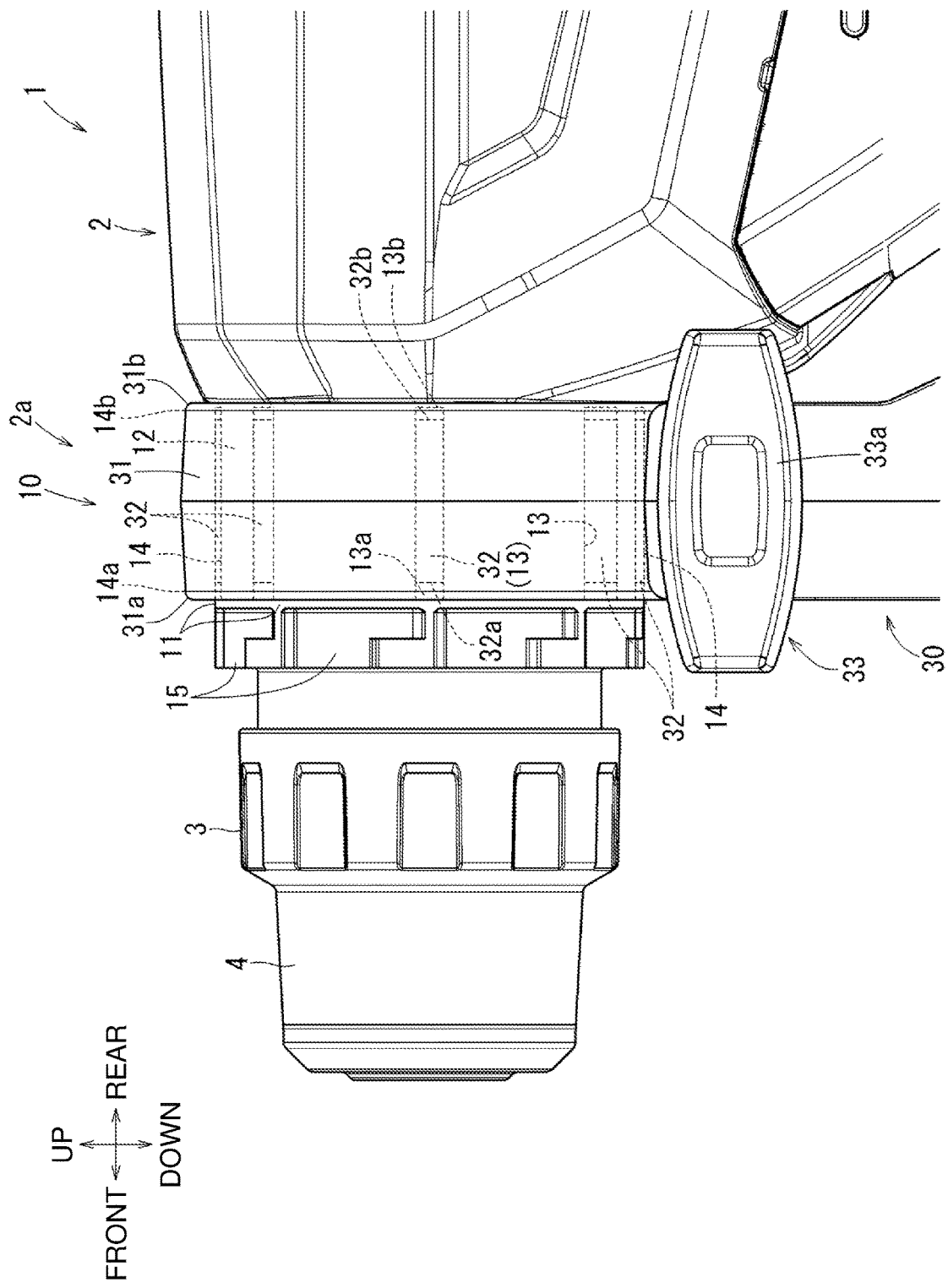
FIG. 6 is a left side view of the handle mount with the second auxiliary handle attached.

As shown in FIG. 6, the second band 31 with an increased diameter is moved from the front to the rear of the tool body 2, or more specifically, to a radially outward position of the fastening surface 12. The diameter of the second band 31 is then decreased. The inner circumferential surface 31a (refer to FIG. 13) of the second band 31 is thus fastened along the fastening surface 12. The grooves 13 and 14 are longer in the axial direction (front-rear direction) than the width between the front ends 32a and the rear ends 32b of the second protrusions 32. With the second band 31 fastened to the fastening surface 12, the front ends 32a of the second protrusions 32 are located rearward from the front ends 13a and 14a of the grooves 13 and 14. With the second band 31 fastened to the fastening surface 12, the rear ends 32b of the second protrusions 32 are located frontward from the rear ends 13b and 14b of the grooves 13 and 14. The second protrusions 32 are thus received and fitted into the grooves 13. The second protrusions 32 are received in and engaged with the grooves 14.

As shown in FIGS. 1 and 2, the power tool 1 includes the main handle 5 integral with the tool body 2. The tool body 2 includes the cylindrical handle mount 10. The handle mount 10 receives the first auxiliary handle 20 or the second auxiliary handle 30 as an auxiliary handle in a removable manner. The handle mount 10 has, on its outer circumferential surface, the grooves 13 and 14 extending in the axial direction. The first auxiliary handle 20 includes the arc-shaped first band 21. The first auxiliary handle 20 includes the band holder 22 holding the two ends (longitudinal ends 21d, refer to FIG. 11) to allow the first band 21 to advance or recede to change the diameter of the first band 21. The first auxiliary handle 20 includes the first protrusions 23 protruding radially inward from the inner circumferential surface (the front wall 22f and the rear wall 22g) of the band holder 22 and engageable with the grooves 13 and 14 (refer to FIG. 9). The second auxiliary handle 30 includes the arc-shaped second band 31 with the cutout 31f in the axial direction. The second auxiliary handle 30 includes the fastener 33 that adjusts the circumferential width of the cutout 31f in the second band 31 to change the diameter of the second band 31. The second auxiliary handle 30 includes the second protrusions 32 protruding radially inward from the inner circumferential surface 31a of the second band 31 and engageable with the grooves 13 and 14 (refer to FIG. 13).

The grooves 13 and 14 thus serve as engagement portions for the first protrusions 23 on the first auxiliary handle 20 and as engagement portions for the second protrusions 32 on the second auxiliary handle 30. The grooves 13 and 14 engaged with the first protrusions 23 lock the first auxiliary handle 20 in a nonrotatable manner relative to the handle mount 10. The grooves 13 and 14 engaged with the second protrusions 32 lock the second auxiliary handle 30 in a nonrotatable manner relative to the handle mount 10. The handle mount 10 can thus receive, in a replaceable manner, the first auxiliary handle 20 including the first band 21 having a diameter decreased or increased in response a change in the lengths by which the longitudinal ends 21d advance or recede and the second auxiliary handle 30 including the second band 31 having a diameter decreased or increased in response to the circumferential width of the cutout 31f being adjusted.

As shown in FIGS. 3, 4, and 7, the tool body 2 has a portion ahead of the handle mount 10 having the same diameter as or a smaller diameter than the handle mount 10. The portion ahead of the handle mount 10 thus has less interference with the first band 21 or the second band 31 when the first band 21 or the second band 31 having an increased diameter is moved in the axial direction. The first band 21 or the second band 31, which may be less elastically deformable and may have a smaller increase in diameter can thus be moved easily to the radially outward position of the handle mount 10.

As shown in FIGS. 3 to 7, the handle mount 10 includes the fastening surface 12 to be in contact with the inner circumferential surface 21a of the first band 21 (refer to FIG. 9) or the inner circumferential surface 31a of the second band 31 (refer to FIG. 13). The handle mount 10 includes the retainer 11 located at the ends of the grooves 13 and 14 in the axial direction and protruding from the grooves 13 and 14. The retainer 11 restricts axial movements of the first protrusions 23 and the second protrusions 32. The retainer 11 has the same or a smaller radial height as or than the fastening surface 12.

When the first band 21 is fastened to the fastening surface 12, the retainer 11 is in contact with the first protrusions 23 to retain the first band 21. When the second band 31 is fastened to the fastening surface 12, the retainer 11 is in contact with the second protrusions 32 to retain the second band 31. The first band 21 or the second band 31 having a decreased diameter and fastened to the fastening surface 12 is increased in its diameter to be movable in the axial direction. The first band 21 or the second band 31 moves toward the retainer 11 having the same or a smaller radial height as or than the fastening surface 12. This reduces interference of the first band 21 or the second band 31 with the retainer 11. This structure reliably retains each of the first band 21 and the second band 31 attached to the handle mount 10, and allows smooth removal of each of the first band 21 and the second band 31 from the handle mount 10.

As shown in FIGS. 5 and 6, the grooves 13 and 14 are longer in the axial direction than the width of the first protrusions 23 (the width between the front ends of the first protrusions 23a and the rear ends of the first protrusions 23b) in the axial direction, and longer in the axial direction than the width of the second protrusions 32 in the axial direction. The first protrusions 23 or the second protrusions 32 can thus be reliably received in the grooves 13 and 14 in the axial direction. This reliably locks and retains the first band 21 or the second band 31 in a nonrotatable manner relative to the handle mount 10.

As shown in FIGS. 5 and 6, the axial positions of the first protrusions 23 on the first band 21 relative to the grooves 13 and 14 when the first auxiliary handle 20 is attached to the handle mount 10 are the same as the axial positions of the second protrusions 32 on the second band 31 relative to the grooves 13 and 14 when the second auxiliary handle 30 is attached to the handle mount 10. In other words, the first auxiliary handle 20 and the second auxiliary handle 30 are attachable to the handle mount 10 at the same axial position. This allows the same operability when the first auxiliary handle 20 is attached and when the second auxiliary handle 30 is attached. This increases selection flexibility of an auxiliary handle attachable to the handle mount 10 and improves the operability of the power tool 1.

As shown in FIGS. 9 and 13, the first protrusions 23 are located on the axial edges (the front wall 22f and the rear wall 22g) of the band holder 22. The second protrusions 32 are located on the axial edges (the front end 31b and the rear end 31c) of the second band 31. The first protrusions 23 can thus be located to be in contact with the front ends 13a and 14a that are the axial edges of the grooves 13 and 14 (refer to FIGS. 5 and 6). The second protrusions 32 can thus be located to be in contact with the front ends 13a and 14a that are the axial edges of the grooves 13 and 14. The grooves 13 and 14 can thus serve as retainers for the first protrusions 23 and for the second protrusions 32.

Figure 8:
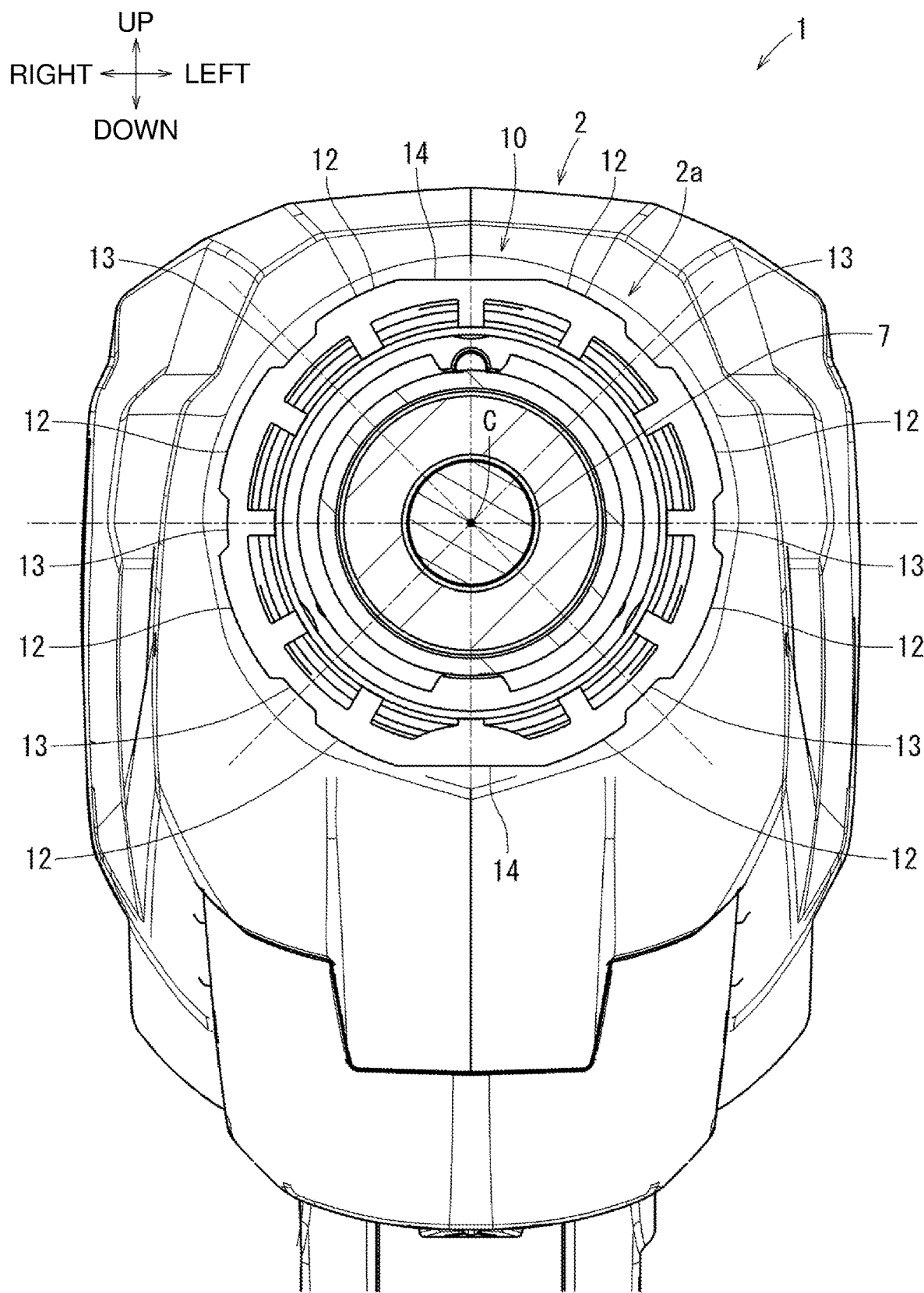
FIG. 8 is a cross-sectional view taken along line VIII-VIII in FIG. 4 as viewed in the direction indicated by the arrows.

As shown in FIGS. 5, 6, and 8, the handle mount 10 has multiple grooves 13 and 14 in the circumferential direction. The first band 21 or the second band 31 is thus locked and retained in a nonrotatable manner at multiple circumferential positions of the handle mount 10. This more reliably retains the position and the orientation of the first band 21 or the second band 31 attached to the handle mount 10.

As shown in FIGS. 5, 6, and 8, two grooves 13 and 14 of the multiple grooves 13 and 14 face each other in the radial direction of the handle mount 10. The first band 21 or the second band 31 can thus be positioned at two positions farthest apart in the radial direction of the handle mount 10. This more reliably retains the orientation of the first band 21 or the second band 31 attached to the handle mount 10.

As shown in FIGS. 5, 6, and 8, the multiple grooves 13 and 14 are four or more grooves 13 and 14 located at equal intervals in the circumferential direction of the handle mount 10. The first auxiliary handle 20 or the second auxiliary handle 30 can thus be attached to the handle mount 10 in one of multiple orientations rotated at predetermined angular intervals (e.g., 90° intervals) in the circumferential direction.

As shown in FIGS. 1 and 2, the power tool 1 is a hammer drill including the first auxiliary handle 20 or the second auxiliary handle 30. The user gripping the first auxiliary handle 20 or the second auxiliary handle 30 attached to the handle mount 10 can thus hold the tool body 2 in a stable posture against repeated striking movements of the hammer drill 1. The first auxiliary handle 20 and the second auxiliary handle 30 are attached in a replaceable manner as appropriate for the use state of the hammer drill 1, improving the operability of the hammer drill 1.

The power tool 1 according to the present embodiment described above may be modified variously. The power tool 1 is a hammer drill in the above embodiment. In some embodiments, the power tool to which the two different auxiliary handles are attachable may be, for example, a driver drill or a grinder that are grippable by a user when being used. The power tool 1 as a single product may include the first auxiliary handle 20 or the second auxiliary handle 30, or include both auxiliary handles. The power tool 1, the first auxiliary handle 20, and the second auxiliary handle 30 may be separate products.

In the above embodiment, the power tool 1 includes the electric motor 6 as a driving source, and power is supplied to the electric motor 6 from an AC power supply. In some embodiments, a rechargeable battery attachable to and detachable from the tool body 2 may be used as a power supply. For example, the technique according to one or more embodiments of the present disclosure may be applicable to power tools drivable with a different power source, such as air tools and engine tools.

The first band 21 is an iron band in the above embodiment. In some embodiments, the first band 21 may be formed from another elastic and rigid metal, such as aluminum. The second band 31 is a resin band in the above embodiment. In some embodiments, the second band 31 may be formed from a highly rigid material, such as metal.

In the above embodiment, the band holder 22 includes the first protrusions 23 engageable with the grooves 13 and 14. In some embodiments, the first band 21 may include the first protrusions 23. For example, both the first band 21 and the band holder 22 may include the first protrusions 23. In the above embodiment, the handle mount 10 has six grooves 13 and two grooves 14. The numbers of grooves 13 and 14 are not limitative, and may be increased or decreased as appropriate. The angular intervals of the grooves 13 and 14 are not limited to 45° as in the above embodiment, and may be changed as appropriate based on, for example, the number of grooves 13 and 14. The grooves 14 may be replaced with grooves 13. The handle mount 10 may thus have all the grooves being grooves 13.

The first auxiliary handle 20 in the above embodiment includes the first band 21 that advances or recedes relative to the band holder 22 when the grip 24 is rotated about its axis relative to the band holder 22. The first band 21 may advance or recede with another structure. For example, the first band 21 may advance or recede relative to the band holder 22 when being pulled. In the above embodiment, the second auxiliary handle 30 includes the second band 31 with a diameter increased or decreased when the operation portion 33a in the fastener 33 is rotated to adjust the circumferential width of the cutout 31f. The circumferential width of the cutout 31f may be adjusted with another structure. For example, the circumferential width of the cutout 31f may be adjusted by pulling or pressing the operation portion.

REFERENCE SIGNS LIST 1 power tool (hammer drill)
2 tool body
2a distal end portion
2b motor housing
2c gear housing
2d forward-reverse switch lever
3 chuck cover
4 chuck
4a tool insertion hole
5 main handle
5a trigger
5b lock button
5c power cable
6 electric motor
7 output shaft
10 handle mount
11 retainer
12 fastening surface
13 groove
13a front end
13b rear end
14 groove
14a front end
14b rear end
15 cup mount
20 first auxiliary handle (auxiliary handle)
21 first band
21a inner circumferential surface
21b front end
21c rear end
21d longitudinal end
21e insertion hole
22 band holder
22a opening
22b box-shaped recess
22c flange
22d through-hole
22e pole insertion hole
22f front wall (inner circumferential surface, edge)
22g rear wall (inner circumferential surface, edge)
23 first protrusion
23a (front) first protrusion
23b (rear) first protrusion
24 grip
24a flange
24b through-hole
24c nut engagement recess
25 fastening unit
25a hexagonal nut
26 band connector
26a insertion portion
26b threaded shaft part
27 lock release button
27a pole engagement portion
27b compression spring
30 second auxiliary handle (auxiliary handle)
31 second band
31a inner circumferential surface
31b front end (edge)
31c rear end (edge)
31d, 31e circumferential end
31f cutout
32 second protrusion
32a front end
32b rear end
33 fastener
33a operation portion
33b bolt
33c hexagonal nut
34 grip
34a flange
C axial center

What is claimed is:

1. A power tool, comprising:
a tool body;
a main handle integral with the tool body;
a handle mount to which a first auxiliary handle or a second auxiliary handle is attachable, the handle mount being cylindrical and located in the tool body, the handle mount having a groove extending in an axial direction on an outer circumferential surface of the handle mount;
the first auxiliary handle including
a first band being arc-shaped,
a band holder holding two ends of the first band to allow the first band to advance or recede to change a diameter of the first band, and
a first protrusion protruding radially inward from an inner circumferential surface of the band holder and engageable with the groove; and
the second auxiliary handle including
a second band being arc-shaped, the second band having a cutout in an axial direction, a fastener configured to adjust a circumferential width of the cutout to change a diameter of the second band, and a second protrusion protruding radially inward from an inner circumferential surface of the second band and engageable with the groove.

2. The power tool according to claim 1, wherein the tool body includes a portion ahead of the handle mount having a same diameter as or a smaller diameter than the handle mount.

3. The power tool according to claim 2, wherein the handle mount includes a fastening surface to be in contact with an inner circumferential surface of the first band or the inner circumferential surface of the second band, and a retainer at an end of the groove in the axial direction and protruding from the groove, the retainer restricts movement of the first protrusion and the second protrusion in the axial direction, and the retainer has a same radial height as or a smaller radial height than the fastening surface.

4. The power tool according to claim 2, wherein the groove is longer in the axial direction than a width of the first protrusion in the axial direction and longer in the axial direction than a width of the second protrusion in the axial direction.

5. The power tool according to claim 2, wherein an axial position of the first protrusion relative to the groove when the first auxiliary handle is attached to the handle mount coincides with an axial position of the second protrusion relative to the groove when the second auxiliary handle is attached to the handle mount.

6. The power tool according to claim 2, wherein the first protrusion is located on an edge of the band holder in the axial direction, and the second protrusion is located on an edge of the second band in the axial direction.

7. The power tool according to claim 1, wherein the handle mount includes a fastening surface to be in contact with an inner circumferential surface of the first band or the inner circumferential surface of the second band, and a retainer at an end of the groove in the axial direction and protruding from the groove, the retainer restricts movement of the first protrusion and the second protrusion in the axial direction, and the retainer has a same radial height as or a smaller radial height than the fastening surface.

8. The power tool according to claim 7, wherein the groove is longer in the axial direction than a width of the first protrusion in the axial direction and longer in the axial direction than a width of the second protrusion in the axial direction.

9. The power tool according to claim 7, wherein an axial position of the first protrusion relative to the groove when the first auxiliary handle is attached to the handle mount coincides with an axial position of the second protrusion relative to the groove when the second auxiliary handle is attached to the handle mount.

10. The power tool according to claim 7, wherein the first protrusion is located on an edge of the band holder in the axial direction, and the second protrusion is located on an edge of the second band in the axial direction.

11. The power tool according to claim 1, wherein the groove is longer in the axial direction than a width of the first protrusion in the axial direction and longer in the axial direction than a width of the second protrusion in the axial direction.

12. The power tool according to claim 11, wherein an axial position of the first protrusion relative to the groove when the first auxiliary handle is attached to the handle mount coincides with an axial position of the second protrusion relative to the groove when the second auxiliary handle is attached to the handle mount.

13. The power tool according to claim 1, wherein an axial position of the first protrusion relative to the groove when the first auxiliary handle is attached to the handle mount coincides with an axial position of the second protrusion relative to the groove when the second auxiliary handle is attached to the handle mount.

14. The power tool according to claim 1, wherein the first protrusion is located on an edge of the band holder in the axial direction, and the second protrusion is located on an edge of the second band in the axial direction.

15. The power tool according to claim 1, wherein the handle mount has a plurality of the grooves in a circumferential direction.

16. The power tool according to claim 15, wherein two of the plurality of grooves face each other in a radial direction of the handle mount.

17. The power tool according to claim 15, wherein the plurality of grooves are four or more grooves located at equal intervals in the circumferential direction of the handle mount.

18. A hammer drill, comprising:
the power tool according to claim 1; and
a tip tool attachable to the power tool.

19. The power tool according to claim 1, wherein the first band is formed from an iron, and
the second band is formed from a resin.

20. The power tool according to claim 19, wherein the fastener adjusts the circumferential width of the cutout by elastically deforming the second band.

\* \* \* \* \*